United States Patent
Kommula et al.

(10) Patent No.: US 10,333,867 B2
(45) Date of Patent: Jun. 25, 2019

(54) ACTIVE-ACTIVE LOAD-BASED TEAMING

(71) Applicant: VMware, Inc., Palo Alto, CA (US)

(72) Inventors: Raja Kommula, Cupertino, CA (US); Thayumanavan Sridhar, Sunnyvale, CA (US); Raj Yavatkar, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 193 days.

(21) Appl. No.: 15/665,141

(22) Filed: Jul. 31, 2017

(65) Prior Publication Data

US 2019/0036848 A1    Jan. 31, 2019

(51) Int. Cl.
| | |
|---|---|
| *H04L 12/24* | (2006.01) |
| *H04W 72/08* | (2009.01) |
| *H04W 88/06* | (2009.01) |
| *H04L 12/803* | (2013.01) |
| *H04L 12/861* | (2013.01) |

(52) U.S. Cl.
CPC ........ *H04L 49/9068* (2013.01); *H04L 47/125* (2013.01); *H04W 72/085* (2013.01); *H04L 41/0886* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,865,160 B1 * | 3/2005 | Bare | ...................... H04L 12/185 370/256 |
| 2011/0055364 A1 * | 3/2011 | Heim | .................. H04L 41/0806 709/223 |

* cited by examiner

*Primary Examiner* — Brian Whipple
(74) *Attorney, Agent, or Firm* — Patterson + Sheridan, LLP

(57) ABSTRACT

Exemplary methods, apparatuses, and systems manage network interface controllers (NICs) to determine when NICs within a host operating in active-passive mode can operate in an active-active mode. A host sends probe messages from a first NIC of the host to determine whether a second NIC of the host receives the probe messages. When the second NIC does not receive probe messages, the NICs within the host can operate in an active-active mode.

20 Claims, 3 Drawing Sheets

ACTIVE-ACTIVE LOAD-BASED TEAMING

FIELD OF THE INVENTION

The various embodiments described in this document relate to the management of network interface controllers. In particular, embodiments relate to detecting connectivity between network interface controllers, transitioning between active-passive and active-active states, and managing network interface controllers in an active-active state of a load balancing configuration.

BACKGROUND OF THE INVENTION

Hosts in typical datacenters are equipped with two or more network interface controllers (NICs), each of which are connected to separate switches for redundancy. In a load-balancing configuration, such as load-based teaming (LBT), a first NIC for a host is used in active mode to send and receive data, and a second NIC for the host is used in passive mode. In passive mode, the second NIC is configured to only to receive (and not send) data until the first NIC reaches a utilization threshold. Once the utilization threshold is reached, the passive NIC becomes active and the active NIC becomes passive. Because switches update their forwarding tables based on the source addresses (e.g., MAC addresses) of packets they are forwarding, switches connected to NICs operating in passive mode are not aware of the presence of the host on which the passive NIC resides. This configuration, however, can result in flooding and network isolation.

Flooding occurs when a packet sent to a destination host reaches a switch connected to a passive NIC of the destination host. As a result of the switch being unaware of the location of the destination host, the switch will flood the data packet along all communication channels to each host connected to the switch. Flooding the data packet to NICs that are not the intended destination results in a reduction of the throughput of each NIC.

Network isolation occurs when a first host loses an active link between an active NIC and a first switch. The first host will convert the link between a passive NIC and a second switch from passive to active to allow the first host to send and receive packets. However, a second host with an active link to the first switch and a passive link to the second switch may not be able to reach the first host by sending packets to the first switch and, because the second host has a passive link to the second switch, it is not able to send packets to the first host via the second switch.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that implement a method of managing network interface controllers (NICs) to determine when NICs within a host operating in active-passive mode can operate in an active-active mode. In the active-active mode, both NICs can send and receive packets. Hosts broadcast a probe message from a first NIC in active mode to determine if the network topology will support operating the NICs in active-active mode. If a second NIC of the same host does not receive the probe message, the host places or maintains the second NIC in an active mode. The first NIC can continue to send probe messages at regular intervals, and if a subsequent probe message is received by the second NIC, the host switches the second NIC to passive mode. When both NICs are in active mode, the host can broadcast the same address on both NICs, thus enabling switches connected to the respective NICs to forward packets without flooding.

Furthermore, when a first host is operating in the active-active mode, the first host can monitor its reception of address resolution packets from other hosts. If a first NIC of the first host receives a broadcast with a network address of a second host, the first host monitors the second NIC to determine if the second NIC received the same broadcast. When the second NIC does not receive the same broadcast of the network address of the second host, the first host determines that the second host has lost connection on one of its links. The first host uses this information to reach the second host by using the NIC of the first host that received the broadcast from the second host. Thus, a host losing connection on one NIC will not result in network isolation of that host.

Figure 1:
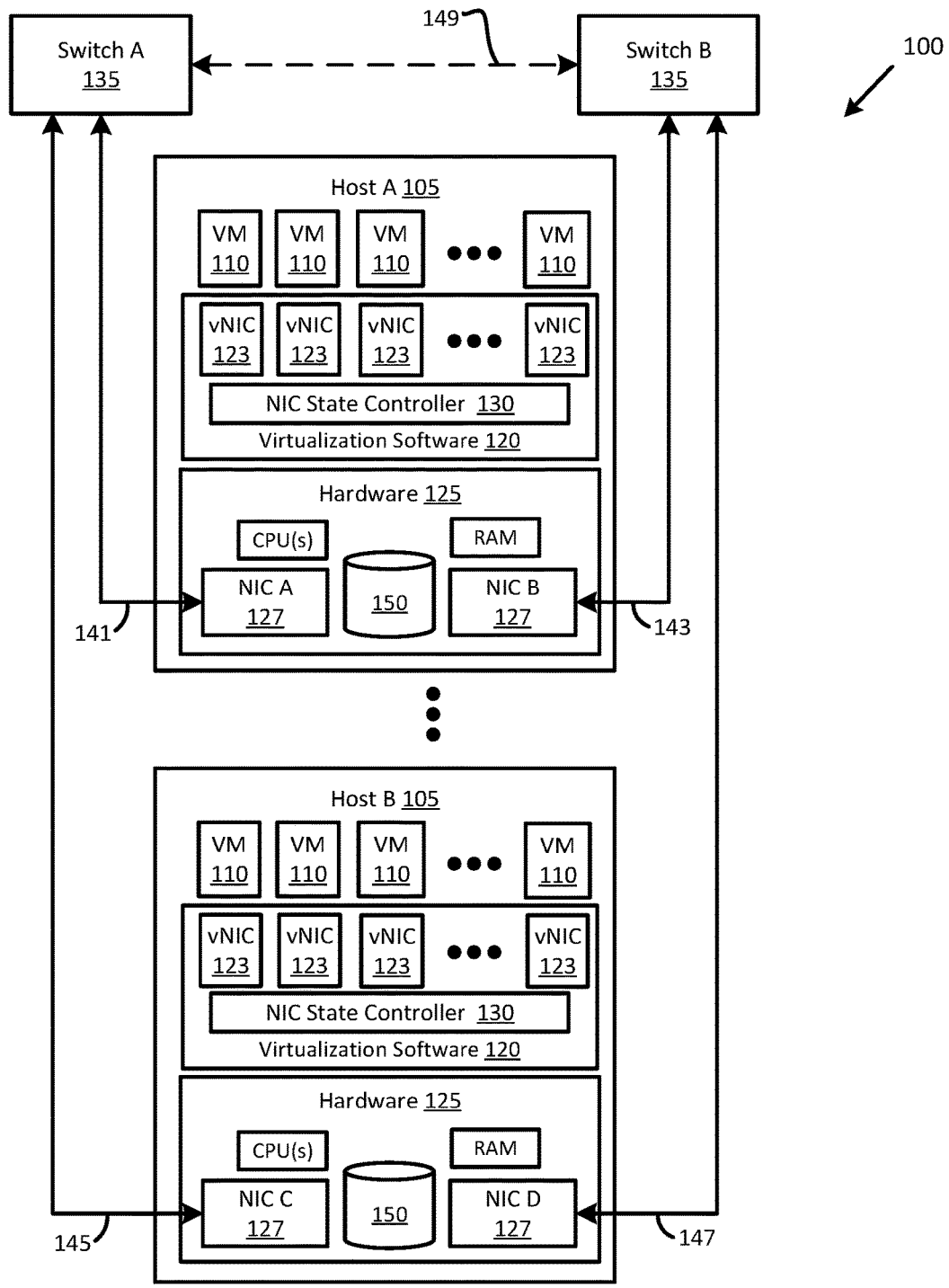
FIG. 1 illustrates, in block diagram form, an exemplary computing environment, including one or more networked hosts configured to manage the states of network interface controllers.

FIG. 1 illustrates, in block diagram form, exemplary computing environment 100, including one or more networked hosts 105 configured to manage the states of network interface controllers. This document may also refer to hosts 105 as nodes, computers, processing devices, and/or servers. In one embodiment, one or more VMs 110 implement a virtualized computer, that can provide computing services such as a network server, remote productivity desktop, or some networking, storage, or security service (e.g., a firewall, webserver, database server, etc.). Although not shown, one or more of VMs 110 may include containerized applications, or be generally referred to as data compute nodes (DCNs) which could include application containers as further described below.

Hardware 125 includes one or more processors (CPU(s)), data storage and memory (e.g., "RAM") 150, and network interface controllers ("NIC(s)") 127. Node 105 uses data storage and memory 150 for storing data, metadata, and programs for execution by the processor(s). Data storage and memory 150 may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic storage devices, optical storage devices, etc. The memory may be internal or distributed memory.

One or more buses may interconnect the various components of hardware 125. Additionally, NICs 127 may connect nodes 105, via a wired or wireless network, with one another.

Virtualization software 120 runs on hardware 125 of host server or node (e.g., a physical computer) 105. Virtualization software 120 manages VMs 110 and physical resources, such as hardware 125. Additionally, virtualization software 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 accessible by VMs 110 residing in one or more nodes 105.

In one embodiment, virtualization software 120 manages one or more virtual network interface controllers (e.g., vNICs 123). For example, virtualization software 120 provides each VM 110 with a corresponding vNIC 123. Virtualization software 120 maps each vNIC 123 to a (physical) NIC 127, e.g., via a virtual switch (not illustrated).

Hosts 105 also include NIC state controller 130. For example, NIC state controller 130 may be a part of virtualization software 120. NIC state controller 130 manages the states (active/passive) of NICs 127 as described with reference to FIGS. 2-3. While described with reference to computing environment 100, NIC state controller 130 may also be implemented in other computing environments. For example, NIC state controller 130 may manage the states of NICs 127 as described within this document in a server, computer, or other computing environment that does not include virtual machines.

Switches 135 are network devices that receive, process, and forward data from a source to a destination. For example, switch A 135 may be a top of rack switch connected to NIC A 127 and NIC C 127 via connections 141 and 145, respectively, and switch B 135 may be a top of rack switch connected to NIC B 127 and NIC D 127 via connections 143 and 147, respectively. Switches A-B 135 forward data traffic to, from, and between hosts 105. In one embodiment, communication channel 149 between switch A 135 and switch B 135 enables communication between switches 135. For example, communication channel 149 may be represent a layer 2 (or data link layer) connection or a layer 3 (or network layer) connection. Communication channel 149 is illustrated as a broken line to indicate that it is optional. Thus, in another embodiment, there is no communication channel between switch A 135 and switch B 135. In one embodiment, host A 105 sends packets to host B 105 by sending the packets via one of switch A 135 and/or switch B 135. For example, NIC A 127 sends packets across communication channel 141 to switch A 135 and switch A 135 forwards the packets to NIC C 127 across communication channel 145. As another example, NIC A 127 sends packets across communication channel 141 to switch A 135, switch A 135 forwards the packets to switch B across communication channel 149, and switch B 135 forwards the packets to NIC D 127 across communication channel 147. In yet another example, NIC B 127 sends packets across communication channel 143 to switch B 135 and switch B 135 forwards the packets to NIC D 127 across communication channel 147.

Figure 2:
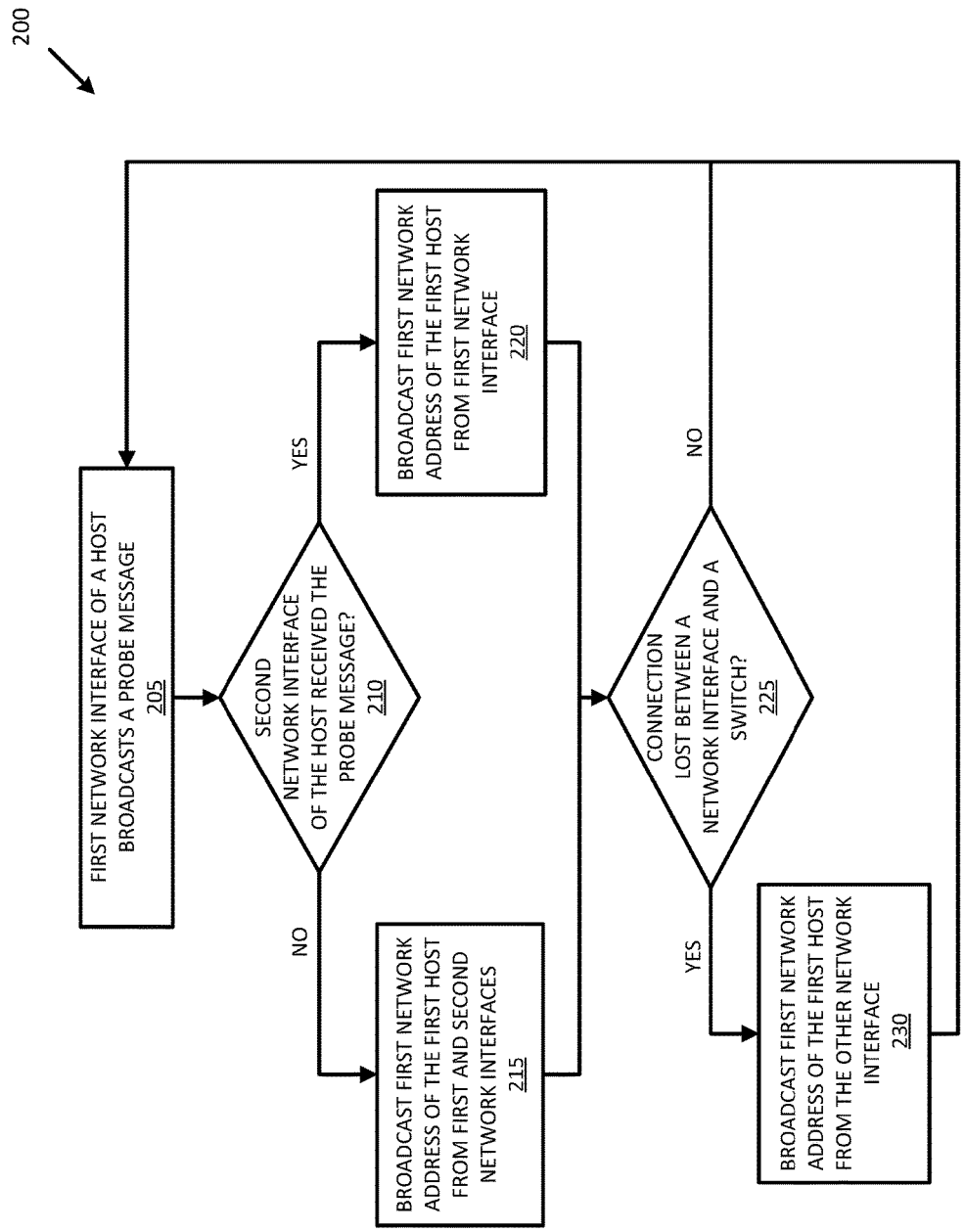
FIG. 2 is a flow chart illustrating an exemplary method of detecting connectivity between NICs, transitioning between active-passive and active-active states, and managing NICs in an active-active state of a load balancing configuration.

FIG. 2 is a flow chart illustrating exemplary method 200 of detecting connectivity between NICs, transitioning between active-passive and active-active states, and managing NICs in an active-active state of a load balancing configuration. Method 200 is described with reference to host A 105 broadcasting a layer 2 probe message from active NIC A 127 to determine whether NIC B 127 receives the probe message or other packets broadcast from NIC A 127. This allows host A 105 to gather information regarding the topology of computing environment 100. Method 200 can be similarly performed using any active NIC 127 within any host 105 in computing environment 100.

At block 205, NIC state controller 130 uses a first network interface (e.g., NIC A 127) of host A 105 connected to switch A 135 transmits a probe message as a layer 2 broadcast. NIC A 127 broadcasts the probe message to switch A 135 across communication channel 141. For example, the destination address (e.g., destination MAC address) of the probe message is set as FF:FF:FF:FF:FF:FF to broadcast the probe message within the boundary of the local network/layer 2 domain. To avoid conflicts with existing address space, host A 105 selects or uses a designated MAC address that is not in use by any devices or components of computing environment 100 as the source address of the probe message.

At block 210, NIC state controller 130 of host A 105 determines if a second network interface (e.g., NIC B 127) of host A 105, connected to switch B 135, received the probe message. If host A 105 receives the probe message via NIC B 127, host A 105 determines that there is a layer 2 connection/path between NIC A 127 and NIC B 127. For example, communication channel 149 may be a layer 2 connection between switch A 135 and switch B 135, providing a layer 2 path from NIC A 127 to NIC B 127. Exemplary layer 2 connections between switch A 135 and switch B 135 include a direct layer 2 link, a layer 2 link via a spine, a link aggregation group (LAG) connection, and a layer 2 fabric connection. As another example, NIC A 127 and NIC B 127 may be connected to the same switch (not illustrated), which would provide a layer 2 connection between NIC A 127 and NIC B 127. If host A 105 does not receive the probe message via NIC B 127, host A 105 determines that there is no layer 2 connection/path between NIC A 127 and NIC B 127. Examples of topology that would not have a layer 2 connection between NIC A 127 and NIC B 127 include communication channel 149 being a multichannel LAG (MLAG), a Virtual PortChannel (vPC), a representation of each of switch A 135 and switch B 135 having a layer 3 connection to a spine, or another layer 3 connection between switch A 135 and switch B 135. As another example, a lack of connection (no layer 2 and no layer 3 connection) between switch A 135 and switch B 135 would result in NIC B 127 not receiving the probe message. When host A 105 determines that NIC B 127 did not receive the probe message (e.g., within a threshold period of time), method 200 proceeds to block 215. When host A 105 determines that NIC B 127 did receive the probe message, method 200 proceeds to block 220.

At block 215, NIC state controller 130 of host A 105 transmits a network address associated with host A as a layer 2 broadcast from both NIC A 127 and NIC B 127. In response to determining that NIC B 127 did not receive the probe message, host A 105 determines that there is not an active layer 2 connection (e.g., communication channel 149) between switch A 135 and switch B 135. In such situations, host A 105 can operate both NIC A 127 and NIC B 127 in active mode, allowing both NIC A 127 and NIC B 127 to send and receive data packets. In one embodiment, NICs A-B 127 broadcast a network address for host A 105. Both switch A 135 and switch B 135 receive the broadcast network address. In one embodiment, NIC A 127 and NIC B 127 broadcast the same network address in a gratuitous address resolution protocol (GARP) packet. For example, NICs A-B 127 may broadcast a link layer address (e.g., MAC address) of a vNIC 123 for a VM 110 running on host A 105. Switch A 135 and switch B 135 update their corresponding forwarding tables with the source addresses (e.g., link layer address of host A 105, host B 105, or VMs 110 broadcast on both NICs A-B 127) based on the source link layer address of the GARPs.

At block 220, in response to determining that NIC B 127 did receive the probe message, NIC state controller 130 of host A 105 broadcasts a network address associated with host A 105 from NIC A 127. In one embodiment, host A determines that there is an active link layer connection (e.g., communication channel 149) between switch A 135 and switch B 135 based on NIC B 127 receiving the probe message transmitted from NIC A 127. In such situations, host A 105 operates NIC A 127 in active mode and NIC B 127 in passive mode, allowing NIC A 127 to send and receive data packets, while only allowing NIC B 127 to receive data packets. In one embodiment, NIC B 127 may have been operating in active mode, and host A 105 switches NIC B 127 from active mode to passive mode. Host A 105 prevents a destination NIC 127 within the same network from receiving multiple copies of the same data packet by operating only one of NIC A 127 and NIC B 127 in active mode. In order to identify NIC A 127 as being active and NIC B 127 as being passive, host A 105 only broadcasts the network address associated with host A 105 from NIC A 127. NIC B 127 does not broadcast the network address associated with host A 105 while in passive mode. In one embodiment, NIC A 127 broadcasts the network address as a GARP packet. In one embodiment, NIC A 127 broadcasts a network address for host A 105 that is received by switch A 135 and switch B 135. In one embodiment, NIC A 127 broadcasts one or more of a MAC address of host A 105, a MAC address of a VM 110 running on host A 105, or another link layer address as the network address. Switch A 135 receives the broadcast(s) from NIC A 127 and forwards the broadcast(s) to switch B 135. Switch A 135 and switch B 135 update their corresponding forwarding tables with the source address (e.g., link layer address) of host A 105 or VM 110 based on the source link layer address of the GARP received from NIC A 127. For example, switch A 135 maps the address broadcast by host A 105 to its port connected to NIC A 127 via communication channel 141 and switch B 135 maps the address broadcast by host A 105 to its port connected to switch A 135 via communication channel 149.

At block 225, NIC state controller 130 of host A 105 monitors communication channel 141 between NIC A 127 and switch A 135 to determine whether communication channel 141 is operating properly or is down or disconnected. Additionally, host A 105 monitors communication channel 143 between NIC B 127 and switch B 135 to determine whether communication channel 143 is operating properly or is down or disconnected. For the ease of explanation, examples described by this document focus on communication channel 141. For example, host A 105 detects a lack of a cable connection (e.g., lack of a signal or voltage on a physical port), that data is not being received and/or cannot be sent across communication channel 141, or otherwise that communication channel 141 has failed. When communication channel 141 is not down or disconnected (i.e., communication channel 141 is operational), method 200 proceeds to block 205 to send out an additional probe message. When host A 105 detects that communication channel 141 is down or disconnected, method 200 proceeds to block 230.

At block 230, NIC state controller 130 of host A 105 broadcasts the network address associated with host A 105 from NIC B 127 in response to detecting that communication channel 141 is down or disconnected. For example, host A 105 sends a GARP packet to switch B 135 and switch B 135 forwards the GARP packet to any other connected switches 135 and/or hosts 105 within the same layer 2 network. Broadcasting the network address associated with host A 105 from NIC B 127 to switch B 135 notifies one or more other hosts 105 connected to switch B 135 that packets directed to the network address of host A 105 can be delivered to host A 105 via their respective connections to switch B 135. Additionally, as described with reference to FIG. 3, the broadcasting of the network address associated with host A 105 from NIC B 127 but not from NIC A 127 provides an indication to other hosts 105 within the layer 2 network that host A 105 cannot be reached via connections to switch A 135.

Method 200 then proceeds back to block 205. In one embodiment, NIC state controller 130 sends probe messages at regular intervals. For example, NIC state controller 130 may send a probe message every 30 seconds. In one embodiment, the probe messages are sent periodically to monitor for any changes to the topology of computing environment 100 that occur based on changes to connections, e.g., between hosts 105 and switches 135 or between switches 135.

Figure 3:
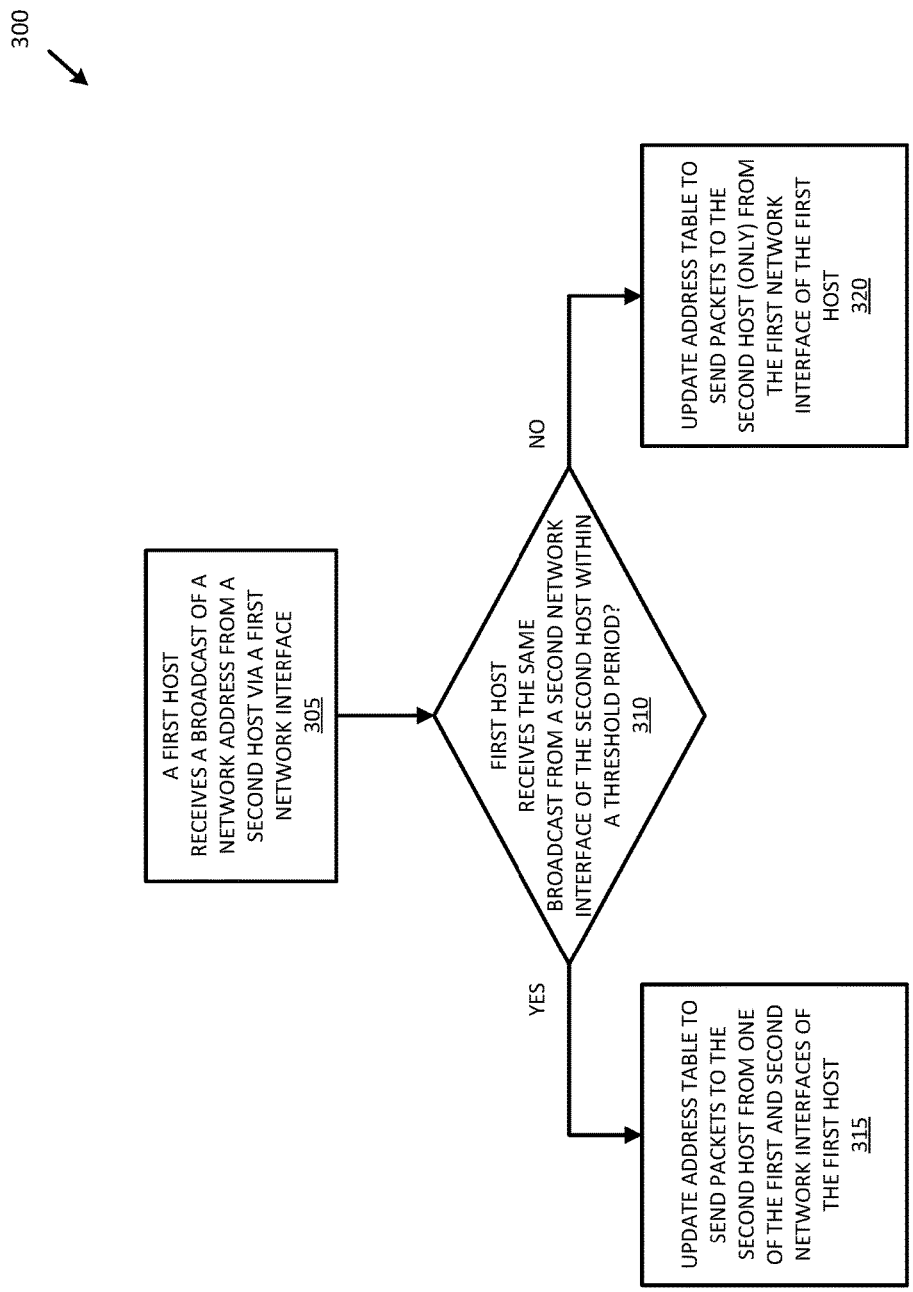
FIG. 3 is a flow chart illustrating an exemplary method of maintaining network addresses for sending packets in an active-active state of a load balancing configuration.

FIG. 3 is a flow chart illustrating an exemplary method 300 of maintaining network addresses for sending packets in an active-active state of a load balancing configuration. In FIG. 3, host A 105 is in active-active mode, where both NIC A 127 and NIC B 127 are configured to send and receive data packets.

At block 305, a first host (e.g., host A 105) receives a broadcast of a network address from a second host (e.g., host B 105) via a first network interface (e.g., NIC A 127). For example, host A 105 receives the broadcast of the network at NIC A 127 from switch A 135 across communication channel 141. In this example, switch A 135 receives the broadcast of the network address from NIC C 127 across communication channel 145. This indicates to host A 105 that host B 105 (or a VM 110 running on host B 105) is reachable via NIC A 127 and communication channel 141.

At block 310, NIC state controller 130 of host A 105 determines whether a second network interface (e.g., NIC B 127) of host A 105 received the same broadcast of the network address within a threshold period of receiving the broadcast via NIC A 127. For example, host A 105 monitors for the broadcast of the same network address to arrive at NIC B 127 from switch B 135. Given that host A 105 is in active-active mode, host A 105 operates under the assumption that other hosts 105 within the network are also in active-active mode. As described with reference to FIG. 2, hosts 105 in active-active mode broadcast addresses from both/multiple NICs 127 unless a connection fails. When host A 105 receives the same broadcast of the network address from NIC B 127 within the threshold period, host A 105 detects that host B 105 is operating normally in active-active mode and method 300 proceeds to block 315. When host A 105 does not receive the same broadcast of the network address via NIC B 127 within the threshold period of receiving the broadcast via NIC A 127, host A 105 determines that host B 105 has lost a connection and method 300 proceeds to block 320.

At block 315, NIC state controller 130 of host A 105 updates an address table to send packets to host B 105 using either of NIC A 127 and NIC B 127. In one embodiment, when host A 105 detects a packet for transmission to the network address associated with host B 105, because NICs A-B 127 are in active-active mode, NIC state controller 130 of host A 105 selects one of NIC A 127 and NIC B 127 for sending the packet to either switch A 135 or switch B 135, respectively. For example, host A 105 selects either NIC A 127 or NIC B 127 using a round robin or other load balancing algorithm. As another example, host A 105 selects a NIC 127 based upon a predefined default selection of a NIC 127 when both NICs 127 are an option for sending the packet to host B 105.

In one embodiment, if the network address of host B 105 is accessible from both NIC A 127 and NIC B 127 of host A 105, NIC state controller 130 of host A 105 uses network I/O control (NIOC) to determine which of NIC A 127 and NIC B 127 to use. In one embodiment, NIOC categorizes traffic into network resource pools, which use resource allocation policies to control bandwidth for various traffic types. For example, if a data packet for sending to host B 105 is of a type that has more bandwidth allocated on NIC A 127 than NIC B 127, host A prioritizes NIC A 127 as the source for sending the packet to host B 105.

At block 320, NIC state controller 130 of host A 105 updates an address table to send packets to host B 105 using NIC A 127. Not receiving the broadcast of the network address at NIC B 127 indicates to host A 105 that communication channel 147 between NIC D 127 in host B 105 and switch B 135 is down or has a loss of connection (or that host B 105 is otherwise inaccessible via NIC B 127), and any packets with host B as the destination can only be sent using NIC A 127. In one embodiment, when host A 105 detects a packet for transmission to the network address associated with host B 105, host A 105 selects NIC A 127 for sending the packet to switch A 135 across communication channel 143.

It will be apparent from this description that aspects of the inventions may be embodied, at least in part, in software. That is, computer-implemented methods 200 and 300 may be carried out in a computer system or other data processing system, such as nodes 105, in response to its processor executing sequences of instructions contained in a memory or another non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in some embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples, operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
broadcasting a probe message from a first network interface of a first host connected to a first switch;
determining that a second network interface of the first host connected to a second switch did not receive the probe message; and
in response to determining that the second network interface of the first host did not receive the probe message,
broadcasting a first network address from the first network interface of the first host notifying the first switch that packets directed to the first network address can be delivered to the first host via the first network interface, and
broadcasting the first network address from the second network interface of the first host notifying the second switch that packets directed to the first network address can also be delivered to the first host via the second network interface.

2. The method of claim 1, wherein broadcasting the first network address comprises:
broadcasting an address resolution packet from each of the first and second network interfaces, each address resolution packet including a link layer address of the first host or a link layer address of a virtual machine (VM) running on the first host.

3. The method of claim 1, further comprising:
broadcasting a second probe message from the first network interface; and
in response to determining that the second network interface of the first host did receive the second probe message, broadcasting the first network address from the first network interface of the first host notifying the first and second switches that packets directed to the first network address can be delivered to the first host via the first network interface.

4. The method of claim 1, wherein the probe message uses a source address that is unused within a network including the first host.

5. The method of claim 1, wherein the first network interface broadcasts probe messages at regular intervals.

6. The method of claim 1, further comprising:
detecting a loss of connection between the first network interface of the first host and the first switch; and
in response to detecting the loss of connection, broadcasting the first network address from the second network interface of the first host notifying one or more other hosts connected to the second switch that packets directed to the first network address can be delivered to the first host via the second switch.

7. The method of claim 1, further comprising:
receiving a first broadcast of a second network address from a second host via the first network interface of the first host;
receiving the first broadcast of the second network address from the second host via the second network interface of the first host;
detecting a first packet to be transmitted to the second network address;
in response to detecting the first packet and receiving the first broadcast of the second network address via the first and second network interfaces, determining that the first packet can be transmitted to the second network address by either of the first network interface or the second network interface;
selecting the first network interface to transmit the first packet; and
in response to selecting the first network interface, transmitting the first packet to the second network address via the first network interface.

8. The method of claim 7, further comprising:
receiving a second broadcast of the second network address from the second host via the second network interface of the first host;
determining that the second broadcast of the second network address has not been received from the second host via the first network interface of the first host within a threshold period of receiving the second broadcast of the second network address from the second host via the second network interface;
detecting a second packet to be transmitted to the second network address;
in response to detecting the second packet and receiving the second broadcast of the second network address via the second network interface but not the first network interface, determining that the first packet can be transmitted to the second network address only via the second network interface; and
in response to determining that the first packet can be transmitted to the second network address only via the second network interface, transmitting the second packet to the second network address via the second network interface.

9. A non-transitory computer-readable medium storing instructions, which when executed by a processing device, cause the processing device to perform a method comprising:
broadcasting a probe message from a first network interface of a first host connected to a first switch;
determining that a second network interface of the first host connected to a second switch did not receive the probe message; and
in response to determining that the second network interface of the first host did not receive the probe message,
broadcasting a first network address from the first network interface of the first host notifying the first switch that packets directed to the first network address can be delivered to the first host via the first network interface, and
broadcasting the first network address from the second network interface of the first host notifying the second switch that packets directed to the first network address can also be delivered to the first host via the second network interface.

10. The non-transitory computer-readable medium of claim 9, wherein broadcasting the first network address comprises:
broadcasting an address resolution packet from each of the first and second network interfaces, each address resolution packet including a link layer address of the first host or a link layer address of a virtual machine (VM) running on the first host.

11. The non-transitory computer-readable medium of claim 9, further comprising:
broadcasting a second probe message from the first network interface; and
in response to determining that the second network interface of the first host did receive the second probe message, broadcasting the first network address from the first network interface of the first host notifying the first and second switches that packets directed to the first network address can be delivered to the first host via the first network interface.

12. The non-transitory computer-readable medium of claim 9, wherein the probe message uses a source address that is unused within a network including the first host.

13. The non-transitory computer-readable medium of claim 9, further comprising:
    detecting a loss of connection between the first network interface of the first host and the first switch; and
    in response to detecting the loss of connection, broadcasting the first network address from the second network interface of the first host notifying one or more other hosts connected to the second switch that packets directed to the first network address can be delivered to the first host via the second switch.

14. The non-transitory computer-readable medium of claim 9, further comprising:
    receiving a first broadcast of a second network address from a second host via the first network interface of the first host;
    receiving the first broadcast of the second network address from the second host via the second network interface of the first host;
    detecting a first packet to be transmitted to the second network address;
    in response to detecting the first packet and receiving the first broadcast of the second network address via the first and second network interfaces, determining that the first packet can be transmitted to the second network address by either of the first network interface or the second network interface;
    selecting the first network interface to transmit the first packet; and
    in response to selecting the first network interface, transmitting the first packet to the second network address via the first network interface.

15. The non-transitory computer-readable medium of claim 14, further comprising:
    receiving a second broadcast of the second network address from the second host via the second network interface of the first host;
    determining that the second broadcast of the second network address has not been received from the second host via the first network interface of the first host within a threshold period of receiving the second broadcast of the second network address from the second host via the second network interface;
    detecting a second packet to be transmitted to the second network address;
    in response to detecting the second packet and receiving the second broadcast of the second network address via the second network interface but not the first network interface, determining that the first packet can be transmitted to the second network address only via the second network interface; and
    in response to determining that the first packet can be transmitted to the second network address only via the second network interface, transmitting the second packet to the second network address via the second network interface.

16. An apparatus comprising:
    a processing device; and
    a memory coupled to the processing device, the memory storing instructions which, when executed by the processing device, cause the apparatus to:
        broadcast a probe message from a first network interface of a first host connected to a first switch;
        determine that a second network interface of the first host connected to a second switch did not receive the probe message; and
        in response to determining that the second network interface of the first host did not receive the probe message,
            broadcast a first network address from the first network interface of the first host notifying the first switch that packets directed to the first network address can be delivered to the first host via the first network interface, and
            broadcast the first network address from the second network interface of the first host notifying the second switch that packets directed to the first network address can also be delivered to the first host via the second network interface.

17. The apparatus of claim 16, further comprising:
    broadcasting a second probe message from the first network interface; and
    in response to determining that the second network interface of the first host did receive the second probe message, broadcasting the first network address from the first network interface of the first host notifying the first and second switches that packets directed to the first network address can be delivered to the first host via the first network interface.

18. The apparatus of claim 16, further comprising:
    detecting a loss of connection between the first network interface of the first host and the first switch; and
    in response to detecting the loss of connection, broadcasting the first network address from the second network interface of the first host notifying one or more other hosts connected to the second switch that packets directed to the first network address can be delivered to the first host via the second switch.

19. The apparatus of claim 16, further comprising:
    receiving a first broadcast of a second network address from a second host via the first network interface of the first host;
    receiving the first broadcast of the second network address from the second host via the second network interface of the first host;
    detecting a first packet to be transmitted to the second network address;
    in response to detecting the first packet and receiving the first broadcast of the second network address via the first and second network interfaces, determining that the first packet can be transmitted to the second network address by either of the first network interface or the second network interface;
    selecting the first network interface to transmit the first packet; and
    in response to selecting the first network interface, transmitting the first packet to the second network address via the first network interface.

20. The apparatus of claim 16, further comprising:
    receiving a second broadcast of the second network address from the second host via the second network interface of the first host;
    determining that the second broadcast of the second network address has not been received from the second host via the first network interface of the first host within a threshold period of receiving the second broadcast of the second network address from the second host via the second network interface;

detecting a second packet to be transmitted to the second network address;

in response to detecting the second packet and receiving the second broadcast of the second network address via the second network interface but not the first network interface, determining that the first packet can be transmitted to the second network address only via the second network interface; and in response to determining that the first packet can be transmitted to the second network address only via the second network interface, transmitting the second packet to the second network address via the second network interface.

\* \* \* \* \*